United States Patent [19]

Meisner et al.

[11] Patent Number: 5,097,984
[45] Date of Patent: Mar. 24, 1992

[54] COFFEE FILTER DISPENSER

[75] Inventors: Edward H. Meisner, Short Hill; Young Chun-Park, Palisades Park, both of N.J.

[73] Assignee: Eagle Affiliates, Inc., Brooklyn, N.Y.

[21] Appl. No.: 672,302

[22] Filed: Mar. 20, 1991

[51] Int. Cl.⁵ .............................. B65H 3/00
[52] U.S. Cl. ........................ 221/37; 221/40; 221/45; 221/210; 221/255; 221/283
[58] Field of Search .......... 221/210, 213, 255, 283, 221/259, 236, 36, 37, 40, 45

[56] References Cited

U.S. PATENT DOCUMENTS

| | | |
|---|---|---|
| 2,795,353 | 6/1957 | Tuttle ................................ 221/46 |
| 4,121,726 | 10/1978 | Pemberton . |
| 4,191,307 | 3/1980 | LeCaire et al. ................ 221/45 |
| 4,214,673 | 7/1980 | Heath et al. ................... 221/259 |
| 4,285,114 | 8/1981 | Underdahl . |
| 4,629,092 | 12/1986 | English . |
| 4,676,396 | 6/1987 | Mamolou . |
| 4,739,902 | 4/1988 | Joslyn et al. . |
| 4,796,779 | 1/1989 | Mamolou . |
| 4,805,801 | 2/1989 | Knopf . |
| 4,836,592 | 6/1989 | Roberts . |
| 4,848,815 | 7/1989 | Molloy . |
| 4,905,870 | 3/1990 | Mamolou . |
| 4,946,066 | 8/1990 | Teitelman ...................... 221/210 |
| 5,600,227 | 7/1986 | Ennis et al. . |

Primary Examiner—H. Grant Skaggs
Attorney, Agent, or Firm—Caesar, Rivise, Berstein, Cohen & Pokotilow, Ltd.

[57] ABSTRACT

A coffee filter dispensing and storage device which is compact, and inexpensive to manufacture. The device comprises a housing having a hollow interior in which a stack of coffee filters are located, and a cover pivotally mounted thereon. The cover includes a simple biased plunger mechanism with a wax or putty-like adherent at one end to extract the top most of a nested stack of coffee filters stored in a device. The device may be placed on a counter or table top or mounted on a wall or beneath a shelf or counter. Restraining tabs are used to prevent the filters from falling or spilling out of the device when the cover is opened. A locking mechanism is provided to hold the cover closed.

18 Claims, 3 Drawing Sheets

COFFEE FILTER DISPENSER

BACKGROUND OF THE INVENTION

This invention relates generally to a dispensing device and particularly to a device for dispensing a single coffee filter from a nested stack of coffee filters stored in the device.

As is known, various coffee making devices make use of a filter through which the brewed coffee passes to prevent grounds from passing through. Typically, such coffee filters are made of fibrous paper in the shape of a truncated cone. They are sold in nested stacks. When the user wishes to obtain a single filter, it is difficult to separate one filter because the filters tend to adhere to each other. Furthermore, after the packaging holding the filters is opened, the filters are exposed to dirt and dust. Thus dispensers have been provided to enable the user to store the coffee filters in a clean environment and to obtain a single filter at a time, as desired.

For example, in U.S. Letters Pat. No. 4,805,801 (Knopf) there is disclosed a package of coffee filters having a filter dispenser. The filters are stacked upside-down and a spring is used to urge the filters upwards, so that the bottom of the top-most filter presses against an adhesive material located on the inside of the lid. When the hinged lid is pivoted to open the container, the single filter which adhered to the inside of the lid is peeled off the adhesive by the user for disposition in the coffee maker.

In U.S. Pat. No. 4,676,396, (Mamolou), there is disclosed a filter housing which can store a plurality of filters with a combination cover and extractor. The extractor comprises a set of spring biased tongs. An adhesive material is located on the bottom of the tongs. A spring is placed below the filters to urge the filters upward against the bottom of the tongs. When the user wishes to extract a single filter, the handles of the tongs are pressed together which causes the adhesive material at the bottom of the tongs to move together, trapping the topmost filter. The lid is then removed and the filter adhering to the bottom of the tongs is removed from the tongs and placed into the coffee maker.

In U.S. Pat. No. 4,629,092, (English), a coffee filter dispenser which uses a biased rotating arm with an adhesive at one end is disclosed. A handle projecting through the hinged lid of the dispenser enables the user to rotate the arm so that the adhesive material presses against the side of the innermost filter. Opening the container by lifting the hinged lid makes a single filter available to the user.

In U.S. Pat. No. 4,905,870, (Mamolou) there is disclosed a dispenser having a housing and unitary inverted V-shaped mechanism with adhesive material at the open ends thereof. The mechanism serves to extract a single filter at a time from the filter housing. The V-shaped end of the mechanism extends beyond the lid sufficiently so that the user can press its two sides together to pinch against the bottom of the topmost filter.

While the devices disclosed in the foregoing patents are generally suitable for there intended purposes, they nevertheless leave much to be desired for various reasons. For example, the dispensers of Mamolou and English and other known coffee filter dispensing and storage devices have extraction means which extend beyond the level of the lid of the device. Thus, they are wasteful with regard to storage and packing for shipment because the devices cannot be stacked upon each other and require larger boxes for shipment which requires more space. Furthermore, when used at the coffee making machines, it is not possible to place other objects on top of the dispenser.

Another shortcoming of existing devices is that they do not make provisions for mounting the container on a side wall, or upside-down, or beneath a counter or shelf. Also, removing or rotating the lid to open the housing would result in some or all of the filters spilling out of the container, when mounted sideways or upside-down. Moreover, many of the prior art devices make use of complex and/or expensive filter dispensing mechanisms.

OBJECTS OF THE INVENTION

Accordingly, it is the general object of the instant invention to provide a coffee filter dispensing and storing device which overcomes the shortcomings of the prior art.

It is a further object of the instant invention to provide a coffee filter dispensing and storage device which is compact and is inexpensive to manufacture.

It is still a further object of the instant invention to provide a coffee filter dispensing and storage device which can be stored and packed atop one another, and upon which other objects can be replaced.

It is still yet a further object of the instant invention to provide a coffee filter dispensing and storage device which uses a simple extracting mechanism with very few parts.

It is another object of the instant invention to provide a coffee filter dispensing and storage device which protects the filters and keeps them clean prior to use.

It is still another object of the instant invention to provide a coffee filter dispensing and storage device which can be mounted on walls or upside-down beneath shelves or counters.

It is still yet another object of the instant invention to provide a coffee filter dispensing and storage device which prevents spillage of the coffee filters stored therein when the device is mounted on a wall or upside-down beneath a shelf or counter.

SUMMARY OF THE INVENTION

These and other objects of the instant invention are achieved by providing a coffee filter dispensing and storage device which uses a biased plunger to extract a single filter at a time. The device comprises a housing having a hinged cover which opens the housing to expose a nested stack of coffee filters. The cover supports the plunger. When the head of the plunger is depressed, and adhesive material located at the bottom of the plunger makes contact with the inside of the top most filter of the stack of filters. By pivoting the cover away from the housing, the single filter adhering to the plunger is carried from the stack and is thus readily available to the user.

The device may be used free-standing on a counter or table top or it may be mounted on a side wall or beneath a counter or shelf. Restraining means are used to prevent the coffee filters from falling out of the device when the cover is opened.

DESCRIPTION OF THE DRAWING

Other objects and many of the intended advantages of this invention will be readily appreciated when the same becomes better understood by reference to the following detailed description when considered in connection with the accompanying drawing wherein.

DETAILED DESCRIPTION OF THE PREFERRED EMBODIMENTS

Figure 1:
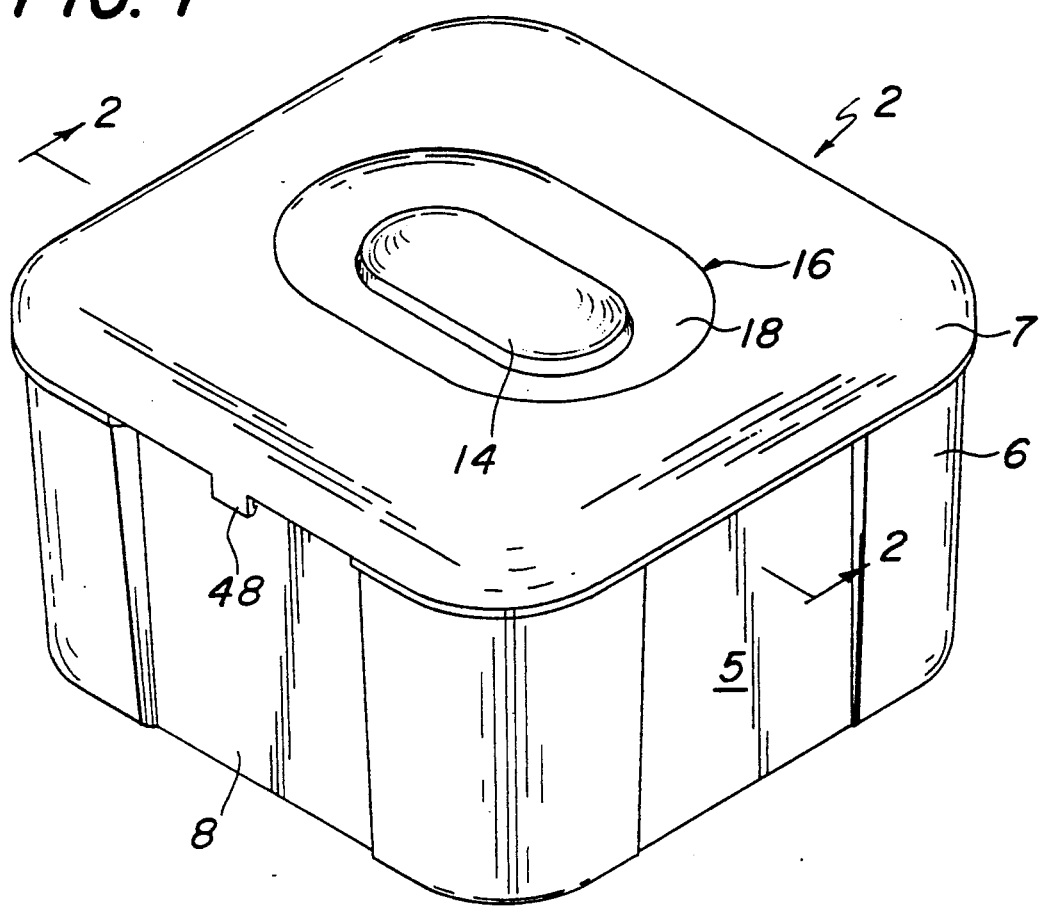
FIG. 1 is a isometric view of the filter dispensing and storage device constructed in accordance with this invention.
Figure 2:
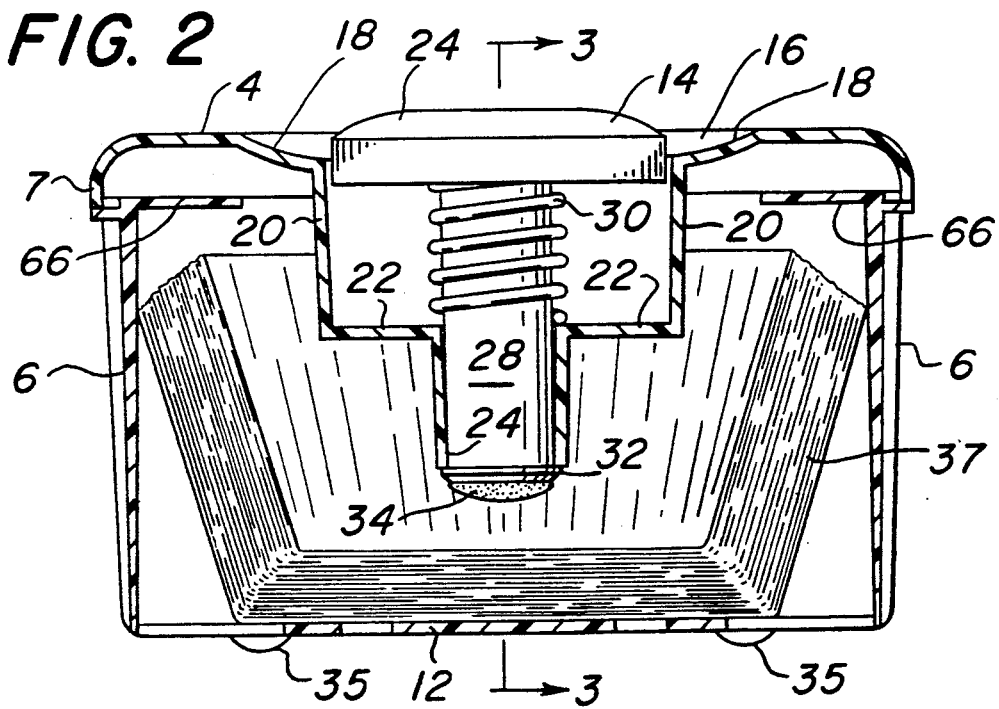
FIG. 2 is a view, partially in section, of the filter dispensing and storage device taken along the line 2—2 of FIG. 1.

Referring now in greater detail to the various figures of the drawing, wherein like reference characters refer to like parts, there is shown in FIG. 1 the coffee filter dispensing and storage device 2 of the present invention. The device 2 comprises a cover 4, and a base 5. The base comprises two side walls 6, a front wall 8, a rear wall 10 (see FIG. 5) and a bottom wall 12 (see FIGS. 2 and 4). The base forms a housing having a hollow interior in which a stack 37 of conventional paper coffee filters are disposed. The cover 4 is a generally planar member having a curved peripheral edge 7. A well 16 or recess having a concave side wall 18 is located in the middle of the cover and is of generally oval shaped.

The cover 4 also includes a depressible filter retrieving mechanism including a plunger 14. The details of the plunger 14 and the interior of the device 2 can be seen in FIG. 2. As can be seen in the figure, the well 16 is bounded by the downwardly sloping concave wall 18, a circumferential vertical wall 20, a horizontal wall 22 and a tubular wall 24.

The plunger 14 basically comprises a head 24 and a tubular shaft 28 which is attached to the head 24, and extends through an opening in the horizontal wall 22 of the well 16. A spring 30, which urges the plunger 14 upward, is in contact with the underside of the head 24 at one end and with the horizontal wall 20 at the other end. A circular lip 32 at the lower end of the tubular shaft 28 keeps the plunger 14 in the well 16, against the urging of the spring 30. The lip 32 extends beyond the periphery of the shaft 28 and abuts the tubular vertical wall 24 to prevent the plunger 14 from moving upward when the plunger is in its rest position.

An adhesive material 34, such as a wax or putty-like material, is disposed on the end of the shaft 28. The adhesive material serves as the means for temporarily securing the uppermost filter onto the plunger so that it can be separated from the stack 27 for extraction, as explained below.

The device 2 rests on feet 35 when it is placed upon a counter top, table top or other surface. Filters 37 are restrained from falling out of the device 2 by inwardly projecting restraining tabs 66 when the cover is open, (such as shown in phantom in FIG. 3). The tabs are of particular utility when the device is mounted on a wall or beneath a counter or shelf so that the filters are subject to falling out, as will be explained later.

Figure 3:
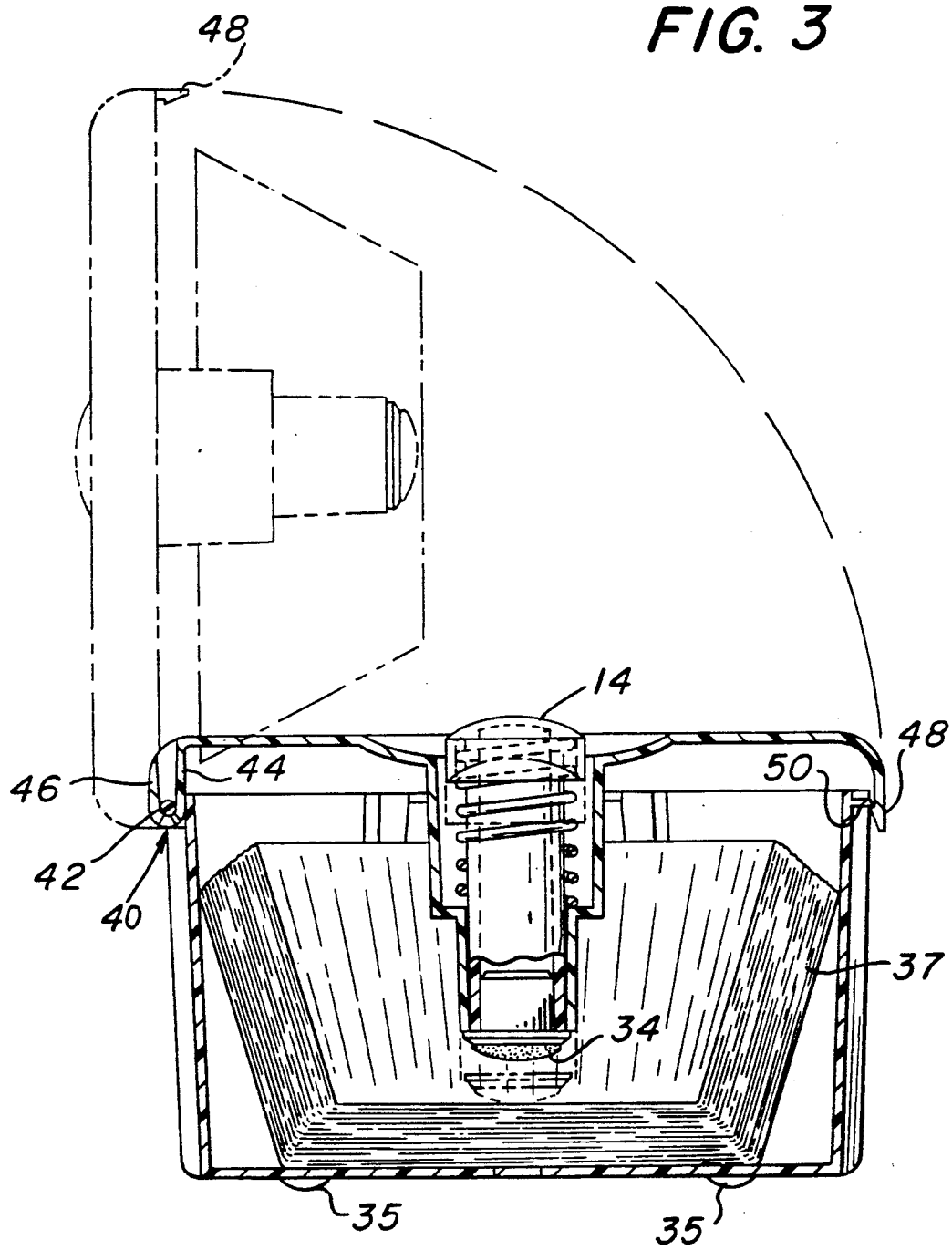
FIG. 3 is a sectional view of the device taken along the line 3—3 of FIG. 2 with the hinged cover of the device shown in phantom lines when it is in the open position and with the plunger of the device shown in phantom lines when the plunger is depressed.

FIG. 3, illustrates the operation of the device 2. Thus as can be seen therein, the cover 4 is arranged to be pivoted from its closed position shown in FIGS. 2 and 3 to the open position shown by phantom lines in FIG. 3. This enables the stack of filters to be placed within the hollow interior of the housing. The cover 4 is then pivoted down to enclose the filters within the housing. A catch 48 is provided on the cover 4 and mates with a projection 50 in the housing's front wall 8 to hold the cover closed.

When the plunger is depressed as shown in the phantom lines, the adhesive material 34 on its bottom end makes contact with the top most of the stack of filters 37. This adhesively secures the filter to the plunger. The release of the head of the plunger allows the spring to bias the plunger back to the solid line position shown in FIG. 3 carrying the topmost filter with it. Thus the topmost filter is removed from the stack. In order to extract the filter from the device, the cover 4 is rotated about a hinge 40 to the phantom line portion shown in FIG. 3. Therefore the adhering filter is now readily accessible to the user. The adhesive material is selected so that the filter can be readily peeled off, thereby readying the adhesive to temporarily secure the next filter (now topmost in the stack) to it for subsequent dispensing in the same manner as just described.

Figure 4:
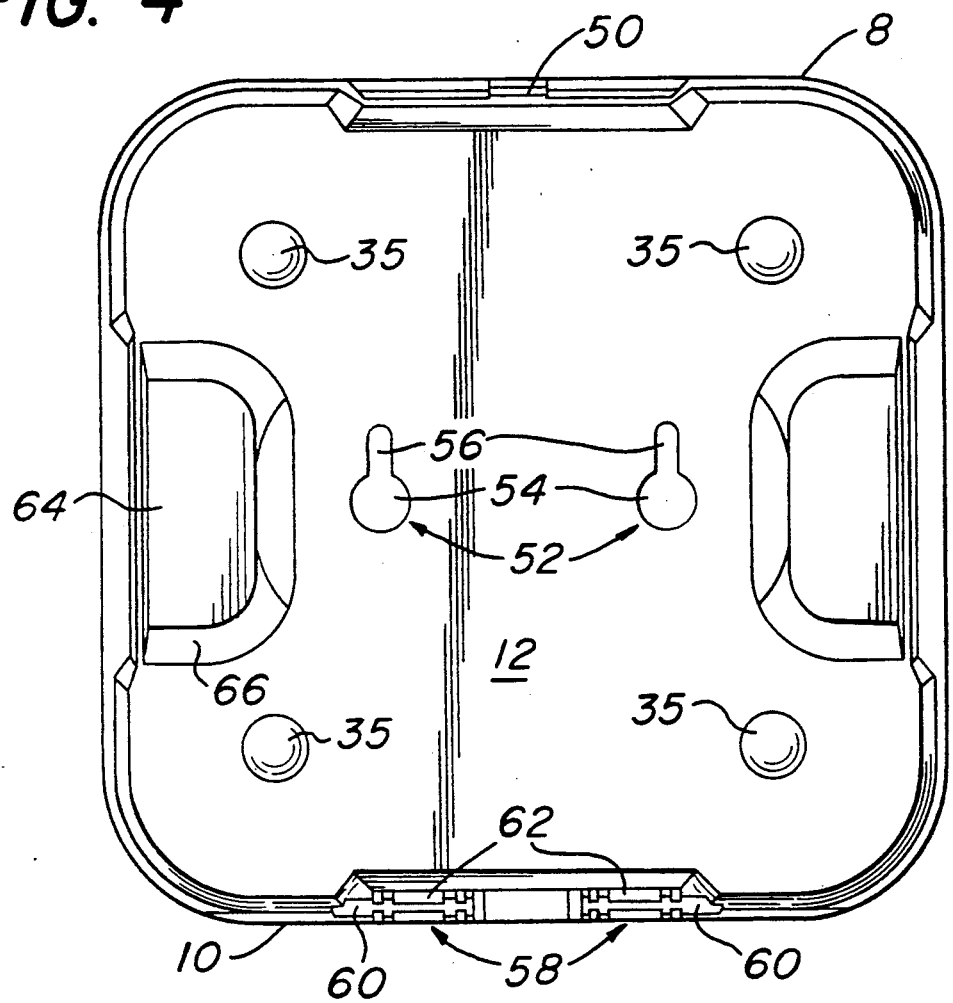
FIG. 4 is a bottom plan view of the device of FIG. 1 shown without any filters therein.
Figure 5:
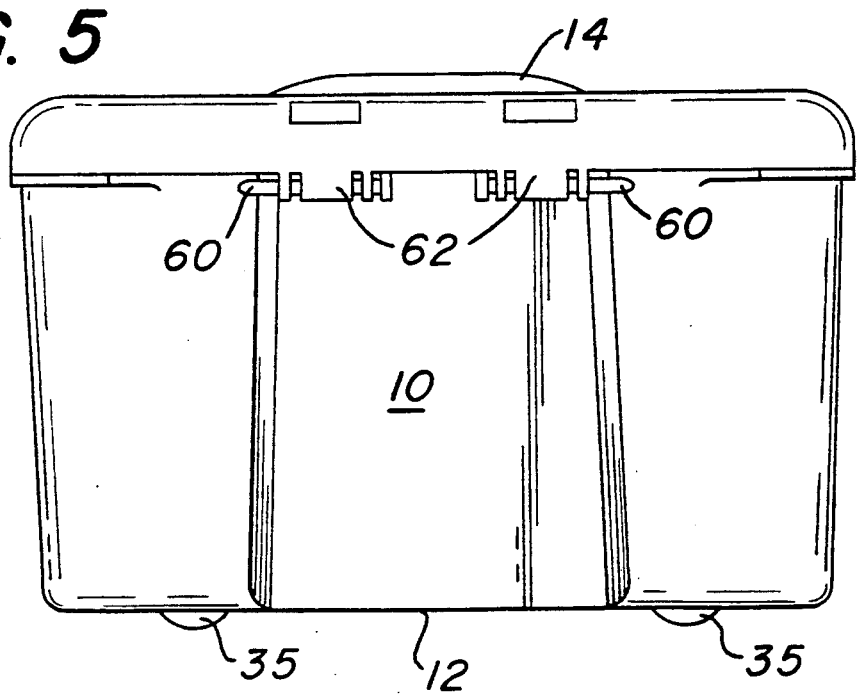
FIG. 5 is a rear elevation view of the filter dispensing and storage device of FIG. 1 showing an alternate means for hinging the top of the device.

In accordance with one preferred embodiment of the invention, hinge 40 comprises a hinge pin 42 enclosed by an inner segment 44 and an outer segment 46. An alternative hinging arrangement is shown in FIG. 4. In this case two hinges 58 are used rather than a single hinge 40 as shown in FIG. 3. The hinge pins 60 are held by hinge tabs 62 so that the cover 4 may be rotated to open the device.

Referring again to FIG. 4 the mounting means 52 for mounting the device on or under any surface is shown. Mounting means 52 comprises plural circular openings 54 and associated narrower elongated slots 56 located in the housing bottom wall 12. To mount the device 2 on a side wall or beneath a shelf, two screws (not shown) are inserted in the wall or shelf at the center lines of the circular openings 54. A small space is left between the screw head and the surface of the wall or shelf. The device 2 is installed by placing the circular openings 54 over the screw heads and moving the device 12 so that the elongated slots 56 abut the screw shafts in the space between the wall or shelf and the screw head.

Referring now to FIG. 4, when the device 2 is mounted either on a vertical wall or beneath a horizontal shelf or counter, and the device 2 is opened by rotating its cover 4 about its hinges 58, or alternatively about the hinge 40, the restraining tabs 66, as can be seen thru openings 64, prevent the filters 37 from falling out of the device 2.

As should be appreciated from the foregoing a coffee filter dispensing and storage device has been described which is easy and inexpensive to manufacture and assemble. It can be made using suitable plastic material and manufacturing techniques. Furthermore, it is compact, it can be stored or packaged one above another, and can be placed on a counter or table top. If desired, it can be mounted on a wall or beneath a shelf or counter near the coffee maker.

Without further elaboration, the foregoing will so fully illustrate my invention that others may, by applying current or future knowledge, readily adapt the same for use under varying conditions of service.

We claim:

1. A device for dispensing and storing coffee filters comprising:
   (a) a housing having a hollow interior for holding a stack of nested coffee filters therein, said housing having a cover and a base, said base having bottom wall and a peripheral wall, said cover including a well;
   (b) a depressible filter retrieval assembly seated within said well, said retrieval assembly comprising a head arranged to be engaged by the user of sad device, a shaft projecting downward from said head and having a bottom end, and a biasing means for said head and shaft, in contact with said head and comrpising a spring;
   (c) adhering means comprising an adhesive material disposed on said bottom of said shaft causing the top one of said nested stack of coffee filters to adhere to said bottom of said shaft when said head and shaft are depressed downward by the user of said device;
   (d) connecting means for pivotally connecting said cover to said peripheral wall, whereupon said cover may be pivoted away from said hollow interior for carrying said top one of said filters away from the remaining filters of said stack;
   (e) means for mounting said housing to a surface;
   (f) restraining means for preventing the filters of said nested stack from falling out of interior said housing when said cover is pivoted away from said interiors, said head comprising a top surface which extends above said cover, said retrieval assembly being depressed when another of said devices, or another object, is placed on said cover, causing said top surface of said head to be level with said top wall.

2. The device of claim 1 wherein said connecting means comprises at least one hinge assembly, with a hinge pin mounted on said peripheral wall and inner and outer segments, which enclose said hinge pin, mounted on said cover.

3. The device of claim 2 wherein said housing further comprises a locking means for holding said cover on said base so that it cannot pivot with respect thereto said locking means comprising a catch attached to said cover which mates with a projection attached to said peripheral wall.

4. The device of claim 3 wherein said well comprises an upper concave wall, an outer circumferential wall, a horizontal wall and an inner tubular vertical wall, said shaft projecting through the said horizontal wall.

5. The device of claim 4 wherein said spring has a top and a bottom portion, and said top portion is in contact with said head and said bottom portion rests on said horizontal wall.

6. The device of claim 5 wherein said inner tubular vertical wall has a bottom, and said shaft has a lower end to which is attached a lip which extends beyond the surface of said shaft, and said lip abuts said bottom of said inner tubular vertical wall when said spring urges said depressible retrieving assembly toward its original position.

7. The device of claim 1 wherein said means for mounting said housing on a surface comprises at least one opening in said bottom wall, said opening comprising a circular portion and a narrower elongated portion so that when a screw with a threaded shaft and a head is inserted into said surface with a space between said screw head and said surface, said device may be mounted by inserting said screw head through said circular portion and moving said device so that said narrower elongated portion is between said screw head and said surface.

8. The device of claim 7 wherein said peripheral wall comprises a top edge, and said restraining means comprises inwardly projecting restraining tabs connected to said top edge which prevents said filters from falling out of said interior of said housing when said cover is pivoted away from said base.

9. The device of claim 8 wherein said spring urges said depressible retrieval assembly back to its original position after it has been depressed downward.

10. The device of claim 9 wherein said connecting means comprises at least one hinge assembly, with a hinge pin mounted on said peripheral wall and inner and outer segments, which enclose said hinge pin, mounted on said cover.

11. The device of claim 10 wherein said housing further comprises a locking means for holding said cover on said base so tat it cannot pivot with respect thereto said locking means comprising a catch attached to said cover which mates with a projection attached to said peripheral wall.

12. The device of claim 11 wherein said well comprises an upper concave wall, an outer circumferential wall, a horizontal wall and an inner tubular vertical wall, said shaft projecting through the said horizontal wall.

13. The device of claim 12 wherein said spring has a top and a bottom portion, and said top portion is in contact with said head and said bottom portion rests on said horizontal wall.

14. The device of claim 13 wherein said inner tubular vertical wall has a bottom, and said shaft has a lower end to which is attached a lip which extends beyond the surface of said shaft, and said lip abuts said bottom of said inner tubular vertical wall when said spring urges said depressible retrieving assembly toward its original position.

15. The device of claim 7 wherein said surface comprises a shelf, and said device is mounted beneath said shelf.

16. The device of claim 7 wherein said surface comprises a wall.

17. The device of claim 7 wherein said surface comprises a counter.

18. A device for dispensing and storing coffee filters comprising:
   (a) a housing having a hollow interior for holding a stack of nested coffee filters therein, said housing having a hinged cover and a base, said base having bottom wall and a peripheral wall, said cover including a well;
   (b) a depressible filter retrieval assembly seated within said well, said retrieval assembly comprising a head arranged to be engaged by the user of said device, a shaft projecting downward from said head and having a bottom end, and a biasing means in contact with said head for said head and shaft;
   (c) adhering means disposed on said bottom of said shaft causing the top one of said nested stack of coffee filters to adhere to said bottom of said shaft when said head and shaft are depressed downward by the user of said device, said head having a top surface which extends above said cover, said retrieval assembly being depressed when another of said devices, or another object, is placed on said cover, causing said top surface of said head to be level with said top wall.

* * * * *